(No Model.)
T. FLETCHER.
INDIA RUBBER GAS PROOF TUBING.
No. 318,458. Patented May 26, 1885.
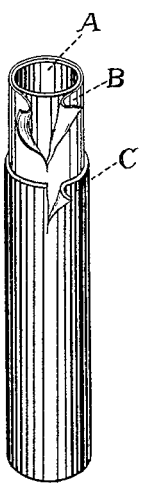
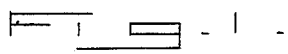
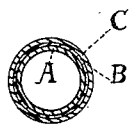
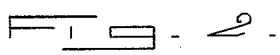
Witnesses:
Otto Hoddick.
W. T. Miller
Inventor.
Thomas Fletcher.
by George B. Snow.
Atty.

UNITED STATES PATENT OFFICE.

THOMAS FLETCHER, OF WARRINGTON, COUNTY OF LANCASTER, ENGLAND.

INDIA-RUBBER GAS-PROOF TUBING.

SPECIFICATION forming part of Letters Patent No. 318,458, dated May 26, 1885.

Application filed November 15, 1884. (No model.) Patented in England June 4, 1884, No. 8,568.

*To all whom it may concern:*

Be it known that I, THOMAS FLETCHER, a subject of the Queen of Great Britain, residing at Warrington, in the county of Lancaster and Kingdom of Great Britain, have invented certain new and useful Improvements in Flexible Tubing for Conducting Gases; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1 is a perspective view of a tube constructed in accordance with my specification. Fig. 2 is a sectional view of the same tube.

This invention relates to the manufacture of flexible tubing used for conducting hydrocarbon and other gases. It is well known that the vulcanized rubber tubing which is generally used for this purpose is easily permeated by the gas which passes through it, thus causing a disagreeable odor to be evolved in the apartment in which it is used.

The object of this invention is to prevent the escape of gases through the substance of the tubing; and it consists in enveloping the conducting-tube with a sheath of thin soft flexible metal—for example, tin-foil—through which the gas cannot pass, and in enveloping and protecting the thin metallic sheath from injury by an outer tube of vulcanized rubber or similar material.

The inner conducting-tube, A, being formed of the unvulcanized rubber compound in the usual manner, a strip of metal foil—preferably tin—is wrapped around the tube, as is shown at B, so that the edges will overlap and the seam run longitudinally along the side of the tube A. If thought expedient, a second strip of foil may be wrapped spirally around the first, but one strip is generally sufficient. Over this another tube, C, is formed of rubber compound, and the whole is then vulcanized in the usual manner.

The metal foil being quite impervious to gas, prevents its gradual penetration to the external surface of the tube, and so does away with the offensive smell so well known as an objection to the use of ordinary rubber tubing for conducting gas. The overlapping of the tin-foil at its edges allows it to yield as the rubber tube stretches when it is forced onto connections, and keeps the gas from escaping. Tubing made according to my invention may thus be used for coupling in precisely the same way as the ordinary tube, having in this respect a great advantage over the tube made with a covering of tin-foil and a braided or woven material according to the old system of manufacture.

I claim as my invention and as a new article of manufacture—

A conducting-tube for hydrocarbon gases, made up of an inner and outer coating of vulcanized rubber and an interposed layer of metal foil, substantially as described.

In testimony whereof I affix my signature in presence of two witnesses.

THOMAS FLETCHER.

Witnesses:
    ALFRED CLARE,
        19 *Palmyra Square, Warrington.*
    JAMES SANDERS,
        144 *Church Place, Warrington.*